(12) United States Patent
Mai et al.

(10) Patent No.: US 9,254,598 B2
(45) Date of Patent: Feb. 9, 2016

(54) MOLD STACK HAVING AN AIR VALVE

(71) Applicant: Husky Injection Molding Systems Ltd., Bolton (CA)

(72) Inventors: Arnold Heinz Mai, Irrel (DE); Pierre Glaesener, Bissen (LU); Adrian Peter Looije, Aurora (CA)

(73) Assignee: HUSKY INFECTION MOLDING SYSTEMS LTD., Bolton, Ontario (CA)

( * ) Notice: Subject to any disclaimer, the term of this patent is extended or adjusted under 35 U.S.C. 154(b) by 0 days.

(21) Appl. No.: 14/381,839

(22) PCT Filed: Mar. 5, 2013

(86) PCT No.: PCT/CA2013/050165
§ 371 (c)(1),
(2) Date: Aug. 28, 2014

(87) PCT Pub. No.: WO2013/142986
PCT Pub. Date: Oct. 3, 2013

(65) Prior Publication Data
US 2015/0069662 A1    Mar. 12, 2015

Related U.S. Application Data

(60) Provisional application No. 61/617,190, filed on Mar. 29, 2012.

(51) Int. Cl.
*B29C 45/43*     (2006.01)
*B29C 45/26*     (2006.01)
*B29C 45/44*     (2006.01)
B29L 31/56       (2006.01)
B29C 45/40       (2006.01)

(52) U.S. Cl.
CPC ............. *B29C 45/2602* (2013.01); *B29C 45/43* (2013.01); *B29C 45/4407* (2013.01); *B29C 2045/4078* (2013.01); *B29L 2031/565* (2013.01)

(58) Field of Classification Search
CPC ............ B29C 2045/4078; B29C 45/43; B29C 45/435
See application file for complete search history.

(56) References Cited

U.S. PATENT DOCUMENTS

| 4,660,801 A | * | 4/1987 | Schad | ..................... B29C 33/46 425/556 |
| 6,164,955 A | * | 12/2000 | Kubota | ................. B29C 45/263 425/437 |
| 6,887,066 B2 | * | 5/2005 | Cerny | ..................... B29C 33/46 264/335 |
| 7,255,824 B2 | | 8/2007 | Cerny et al. | |
| 2004/0145087 A1 | | 7/2004 | Cerny et al. | |

FOREIGN PATENT DOCUMENTS

| WO | 2011/020171 | * | 2/2011 |
| WO | 2011130847 A1 | | 10/2011 |
| WO | 2012019304 A1 | | 2/2012 |

OTHER PUBLICATIONS

PCT International Search Report; Zhang, Pengfei; May 6, 2013; 3 pages.

* cited by examiner

*Primary Examiner* — Jill Heitbrink (57) ABSTRACT

Disclosed herein, amongst other things is a first stack portion (112, 212) of a mold stack (110, 210) for use in an injection mold (100, 200). The first stack portion (112, 212) includes a first stack member that is configured to define a molding cavity (116, 216) in cooperation with a second stack portion (114, 214) of the mold stack (110, 210), a second stack member that is movable relative to the first stack member, and an air valve (160, 260) is defined between the first stack member and the second stack member, the air valve (160, 260) being selectively actuatable with relative movement of the first stack member and the second stack member.

8 Claims, 10 Drawing Sheets

MOLD STACK HAVING AN AIR VALVE

TECHNICAL FIELD

Non-Limiting embodiments disclosed herein generally relate to a mold stack for use in an injection mold and a related method of molding.

BACKGROUND OF THE INVENTION

U.S. Pat. No. 7,255,824 to CERNY et al., published on Aug. 14, 2007 discloses an apparatus for molding a plastic closure that includes a male mold assembly including a forming pin and an outer pin sleeve which cooperate with a female mold for defining a mold cavity. To facilitate mechanical stripping of a molded closure from the forming pin, pressurized air is introduced into the molded closure through at least one air passageway which extends axially between the forming pin and pin sleeve. By outwardly expanding and forming the plastic closure during ejection from the forming pin, forces to which the closure is subjected during ejection are significantly reduced, thereby desirably reducing the amount of cooling of the closure that is required during the molding cycle prior to ejection. Significantly increased operating speeds for the compression molding apparatus can thus be achieved.

SUMMARY OF THE INVENTION

An aspect of the present invention is to provide a first stack portion of a mold stack for use in a mold. The first stack portion includes a first stack member that is configured to define a molding cavity in cooperation with a second stack portion of the mold stack, a second stack member that is movable relative to the first stack member, and an air valve is defined between the first stack member and the second stack member, the air valve being selectively actuatable with relative movement of the first stack member and the second stack member.

Another aspect of the present invention is to provide a method of molding that includes the steps of: arranging a first stack portion and a second stack portion of a mold stack in a closed configuration to define a molding cavity therebetween; injecting molding material into the molding cavity to mold a molded article therein; and repositioning a first stack member of the first stack portion relative to a second stack member of the first stack portion to actuate an air valve that is defined therebetween. These and other aspects and features of non-limiting embodiments will now become apparent to those skilled in the art upon review of the following description of specific non-limiting embodiments of the invention in conjunction with the accompanying drawings.

DETAILED DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE EMBODIMENT(S)

Reference will now be made in detail to various non-limiting embodiment(s) of a mold stack for use in an injection mold. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
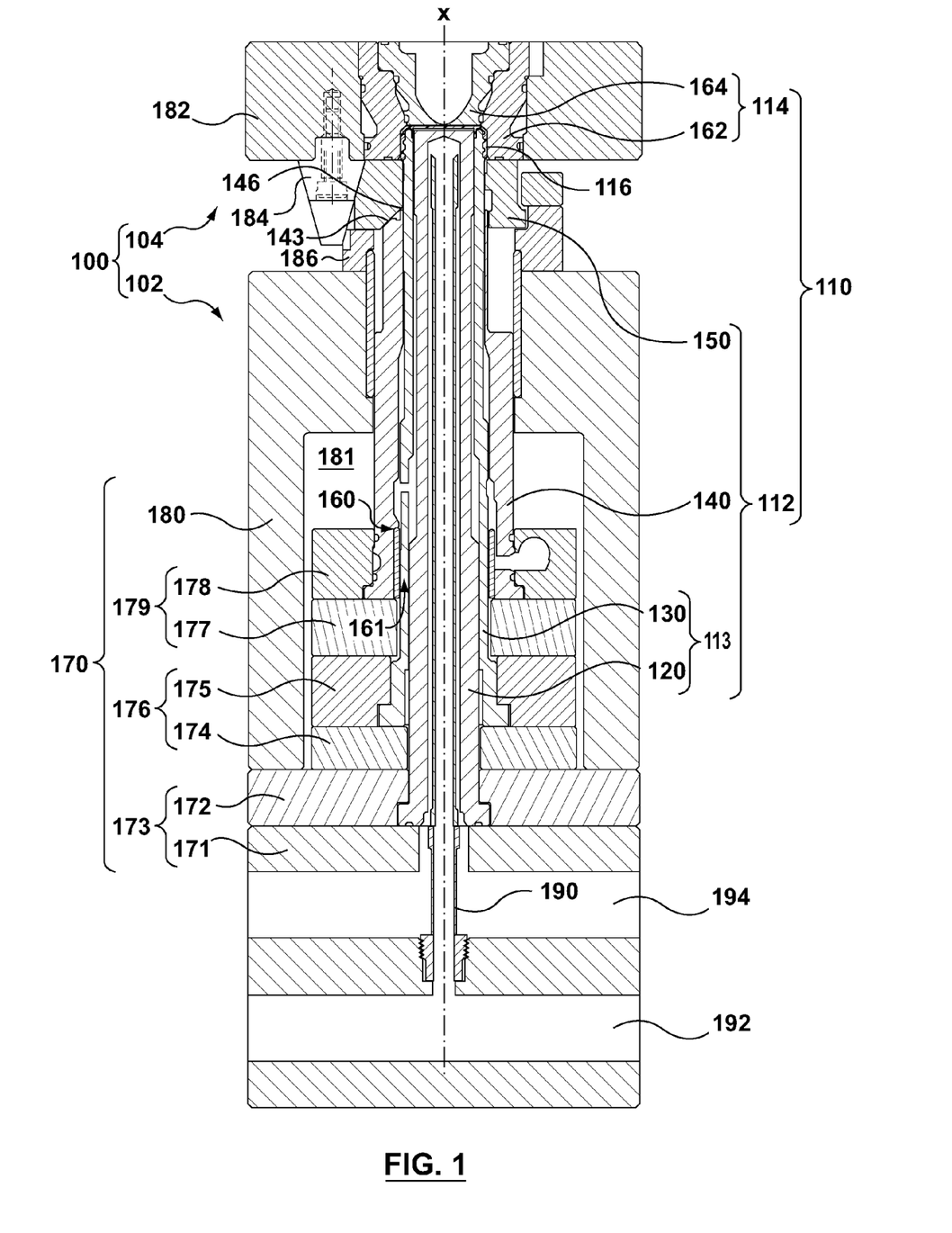
FIGS. 1-3 and 4A depict an operational sequence of a first non-limiting embodiment of an injection mold.

With reference to FIG. 1, the detailed construction of a non-limiting embodiment of an injection mold 100 may be appreciated. The construction of the injection mold 100 is similar to that described in commonly assigned PCT patent application publication WO2011/130847 to Looije, A., published on Oct. 27, 2011. As such, a detailed description of common features has been omitted herein. The injection mold 100 broadly includes a first mold half 102 and a second mold half 104. The first mold half 102 and the second mold half 104 are movable relative to each other, in use, along a mold-stroke axis X, for closing and opening of a molding cavity 116 that is definable therebetween within which a molded article 118 (FIG. 2), such as, for example, a closure of the type for capping a container, is moldable. More specifically, the molding cavity 116 is definable between a first stack portion 112 and a second stack portion 114 of a mold stack 110 that are associated with the first mold half 102 and the second mold half 104, respectively.

The first mold half 102 broadly includes the first stack portion 112 that is associated with a first mold shoe 170.

The first stack portion 112 broadly includes a core insert 113 (i.e. an inner core 120 and an outer core 130), a stripper sleeve 140 and a pair of slides 150. Together, the inner core 120, the outer core 130 and the pair of slides 150 are configured to define an inner portion and an encapsulated portion of the molding cavity 116. The stripper sleeve 140 is configured to strip the molded article 118 (FIG. 2) from the first stack portion 112 and more particularly the core insert 113.

The first mold shoe 170 is configured to house and reposition the members of the first stack portion 112. The first mold shoe 170 includes an inner core plate assembly 173, an outer core plate assembly 176, a stripper plate assembly 179 and an ejector box 180. The inner core plate assembly 173, the outer core plate assembly 176 and the stripper plate assembly are movable relative to each other, along the mold-stroke axis X, for moving the inner core 120, the outer core 130, and the stripper sleeve 140 that are associated therewith, respectively. The inner core plate assembly 173 includes an inner core plate 171 and an inner core retainer plate 172 that are connectable together for retaining a portion of the inner core 120 therebetween. Similarly, the outer core plate assembly 176 includes an outer core plate 174 and an outer core retainer plate 175 that are connectable together for retaining a portion of the outer core 130 therebetween. Lastly, the stripper plate assembly 179 includes a stripper plate 177 and a stripper plate retainer 178 that are connectable together for retaining a portion of the stripper sleeve 140 therebetween. The ejector box 180 is connected to the inner core plate assembly 173 and defines a cavity 181 therein within which to accommodate the outer core plate assembly 176 and the stripper plate assembly 179. The ejector box 180 also includes a slide retainer 186 mounted to a top face thereof for slidably retaining the pair of slides 150 thereto.

The structure of the first stack portion 112 will now be described in more detail.

The inner core 120 has a tubular body that is closed at a free end thereof (i.e. the end thereof that is opposite from the inner core plate assembly 173). The free end of the inner core 120 defines part of the inner portion of the molding cavity 116. A cooling tube 190 is arranged within the inner core 120 for defining a coolant channel therein. In use, coolant circulation is established within the inner core 120, via the cooling tube 190, from a coolant outlet conduit 192 and a coolant inlet conduit 194 that are defined in the inner core plate 171.

The outer core 130 has a tubular body that is slidably arranged around the inner core 120. A free end of the outer core 130 (i.e. the end thereof that is opposite from the outer core plate assembly 176) defines a remaining part of the inner portion of the molding cavity 116. In operation, the outer core 130 is movable relative to the inner core 120, along the mold-stroke axis X, with relative movement of the outer core plate assembly 176 and the inner core plate assembly 173 which may be appreciated by contrasting FIGS. 1 and 3.

The stripper sleeve 140 has a tubular body that is slidably arranged around the outer core 130. A free end of the stripper sleeve 140 (i.e. the end thereof that is opposite from the stripper plate assembly 179) defines a stripping surface 146 that is configured for stripping the molded article 118 (FIG. 2) from the outer core 130 with relative movement thereof. The stripper sleeve 140 is also configured for opening the pair of slides 150. In particular, the stripper sleeve defines a wedging surface 143 that cooperates with a complementary wedging surface on the pair of slides 150 with relative motion thereof as may be appreciated by contrasting FIGS. 1 and 2. In operation, the stripper sleeve 140 is movable relative to the outer core 130 and the pair of slides 150, along the mold-stroke axis X, with relative movement of the stripper plate assembly 179 and the inner core plate assembly 173.

The pair of slides 150 consists of a pair of bodies that are slidably retained on the slide retainer 186 of the first mold shoe 170. An inner surface on each of the pair of bodies is cooperable to define an encapsulated portion of the molding cavity 116 therebetween. In operation, the pair of slides are movable relative to each other perpendicular to the mold-stroke axis X for releasing an encapsulated portion of the molded article 118 (FIG. 2) therefrom.

The second mold half 104 broadly includes the second stack portion 114 that is associated with a second mold shoe 182.

The second stack portion 114 broadly includes a cavity insert 162 and a gate insert 164. Together, the cavity insert 162 and the gate insert 164 are configured to define an outer portion of the molding cavity 116. The gate insert 164 is also configured to connect the molding cavity to a source of molding material (not shown) such as a hot runner or the like.

The second mold shoe 182 is configured to house the members of the second stack portion 114. Lastly, the second mold shoe 182 also includes a wedge bar 184 that is configured to cooperate with the pair of slides 150, across a tapered interface, for holding them in a molding configuration when the injection mold 100 is closed.

The description shall now turn to the structure and operation of a pneumatic structure with which to assist with ejecting (or stripping) of the molded article 118 from the core insert 113.

Figure 2:
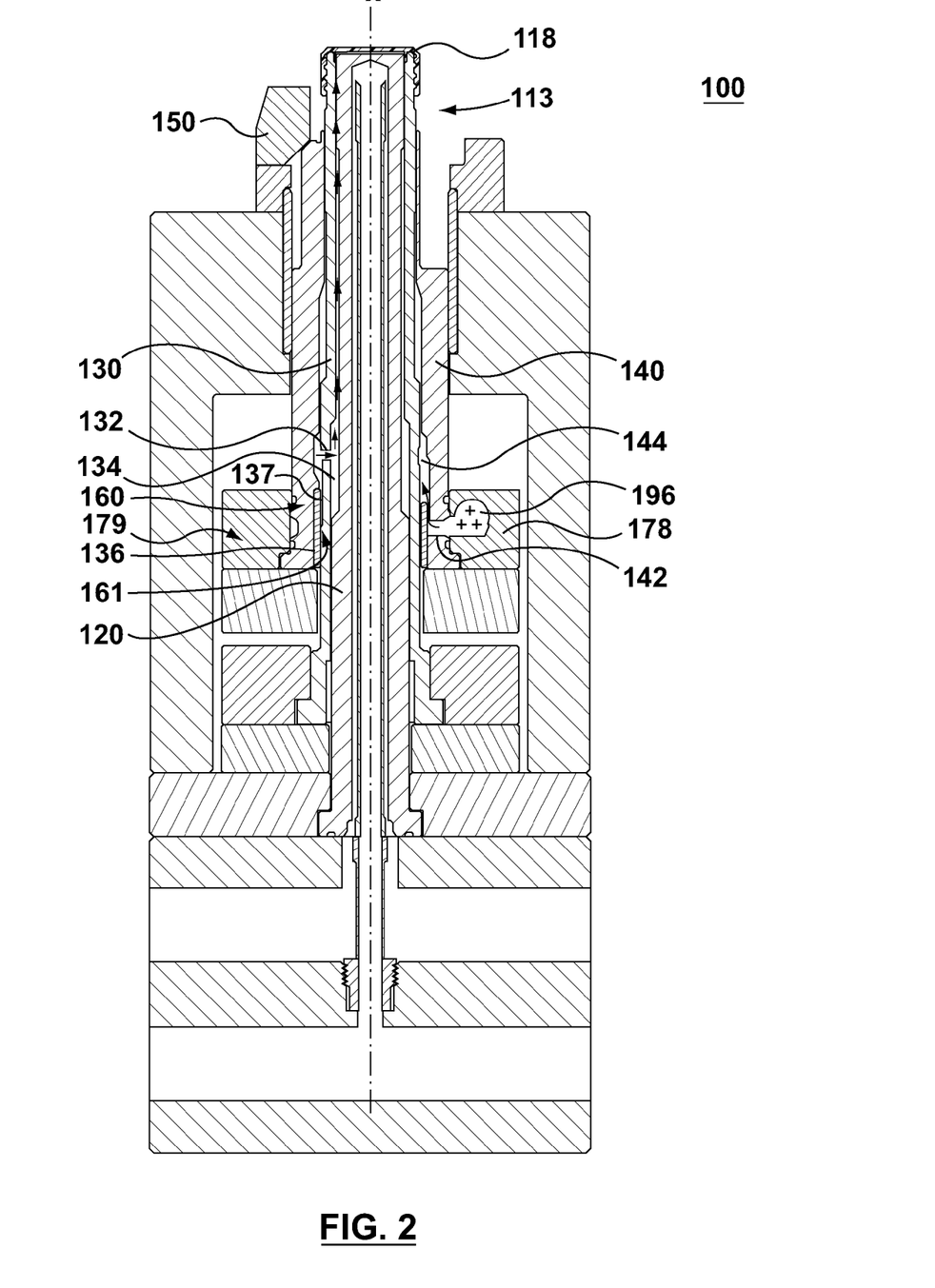

With reference to FIG. 2, a first step of ejection of the molded article 118 from the injection mold 100 has been affected with opening of the injection mold 100. Subsequently, the pair of slides 150 has been opened to release the encapsulated portion of the molded article 118 through a wedging action that is provided by forward movement of the stripper sleeve 140 relative to the core insert 113. To assist in ejecting the molded article 118 from the inner core 120 compressed air is being routed there behind. The direction of air flow is indicated by flow arrows. In particular, air is being provided from an air source 196 that is defined in the stripper retainer plate 178. The air is directed from the air source 196 through an outer air portal 142 that is defined in the stripper sleeve 140 and into an air chamber 144 that is defined between the stripper sleeve 140 and the outer core 130. From there, the air is directed through an inner air portal 132 that is defined in outer core 130 and into an air channel 134 that is defined between the outer core 130 and the inner core 120.

Figure 3:
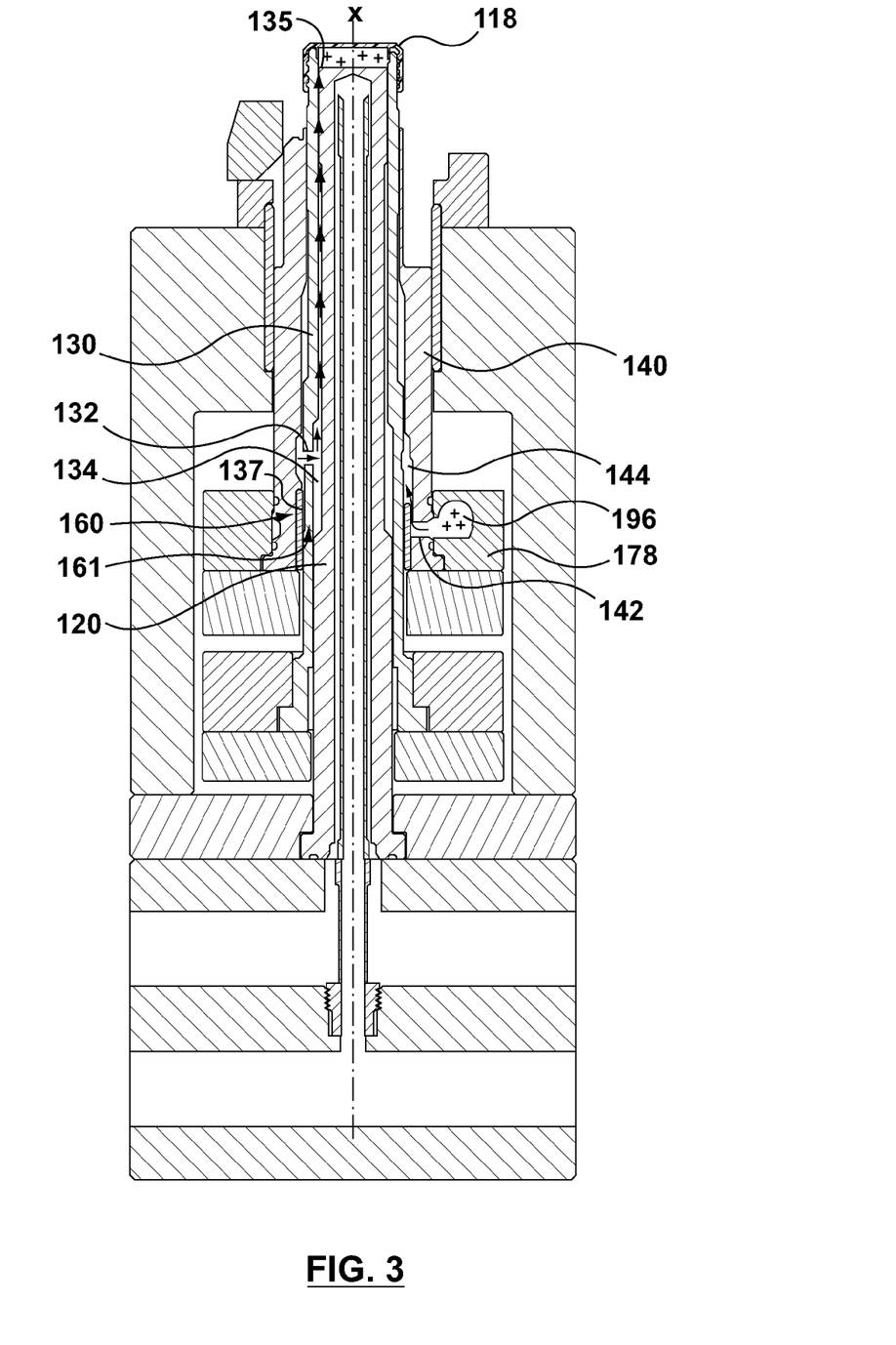

With reference to FIG. 3, the next step in the ejection of the molded article 118 involves the repositioning of the outer core 130 relative to the inner core 120 which releases an annular portion of the molded article 118 from therebetween. Also with the repositioning of inner core 120 and the outer core 130 an outlet 135 of the air channel 134 is opened to allow air therefrom to pressurize the space behind the molded article 118 and thereby assist in the de-molding of the molded article 118 from the inner core 120.

Figure 4A:
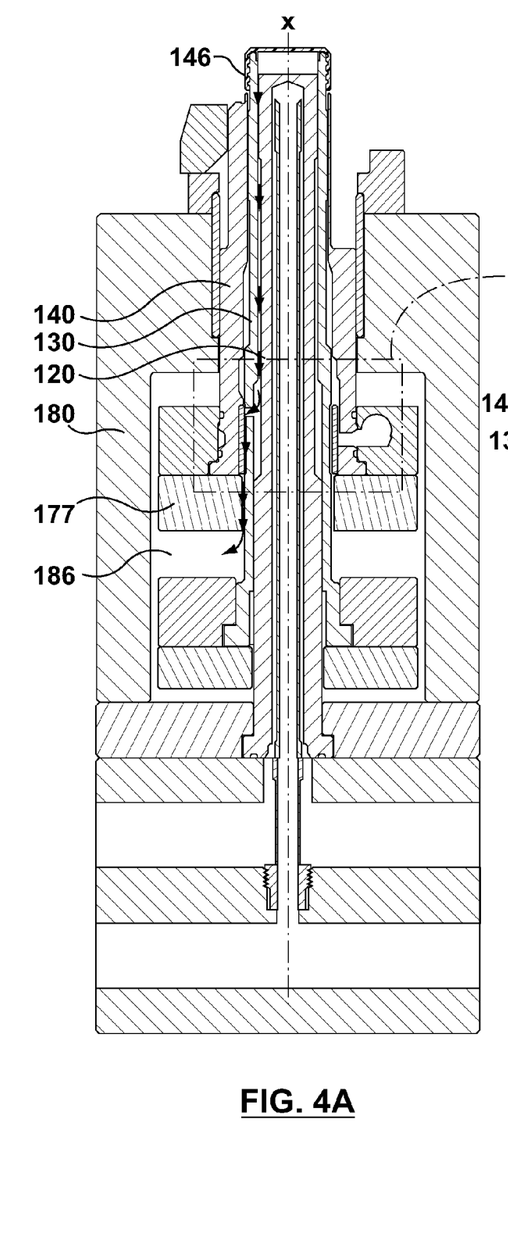

With reference to FIG. 4A, the next step in the ejection of the molded article 118 involves the repositioning of the stripper sleeve 140 relative to the outer core 130. In so doing, the stripping surface 146 on the stripper sleeve 140 engages with a base of the molded article 118 for stripping the molded article 118 from the outer core 130. Also with the repositioning of the stripper sleeve 140 relative to the outer core 130, as best shown with reference to the enlarged view of FIG. 4B, it may be appreciated that the inner air portal 132 is aligned and closely abuts with a seal member 136 that is associated with the stripper sleeve 140 and in so doing the inner air portal 132 is isolated, or sealed, as indicated at reference S, from the air chamber 144. In effect, the inner air portal 132 and the seal member 136 cooperate to provide an air valve 160 that is actuatable with relative positioning of the stripper sleeve 140 and the outer core 130. That is, the air valve 160 is configured to control air flow between an air source 196 and the air channel 134. The air valve 160 may be considered to be open when the stripper sleeve 140 and the outer core 130 have a relative position such as that shown in FIG. 1, 2 or 3, wherein the inner air portal 132 is unobstructed by the seal member 136. In contrast, the air valve 160 may be considered to be closed when the stripper sleeve 140 and the outer core 130 have a relative position such as that shown in FIG. 4B, wherein the inner air portal 132 is obstructed by the seal member 136.

Furthermore, the overpressure behind the molded article 118 may be vented to further ensure that there is little to no net force from the air acting on the molded article 118 at the time that it loses contact with the outer core 130. A technical effect of the foregoing may include a predictable and repeatable ejection profile for the molded article 118. To assist in venting the air pressure from behind the molded article 118 it may be appreciated that the air may be routed back down the air channel 134 whereupon it exits the inner air portal 132 into a vent channel 138 and from there into the ambient environment. The vent channel 138 is defined between the seal member 136 and a vent groove 137 that is defined on an outer surface of the outer core 130. The direction of air flow is indicated by flow arrows. The foregoing requires the opening of an exhaust valve 161 that is defined between the vent groove 137 and the seal member 136 that is actuatable with relative positioning of the stripper sleeve 140 and the outer core 130. The exhaust valve 161 may be considered to be closed when the stripper sleeve 140 and the outer core 130 have a relative position such as that shown in FIG. 1, 2 or 3, wherein the vent groove 137 is entirely obstructed by the seal member 136. In contrast, the exhaust valve 161 may be considered to be open when the stripper sleeve 140 and the outer core 130 have a relative position such as that shown in FIG. 4B, wherein a lowermost portion of the vent groove 137 is unobstructed by the seal member 136.

Figure 5:
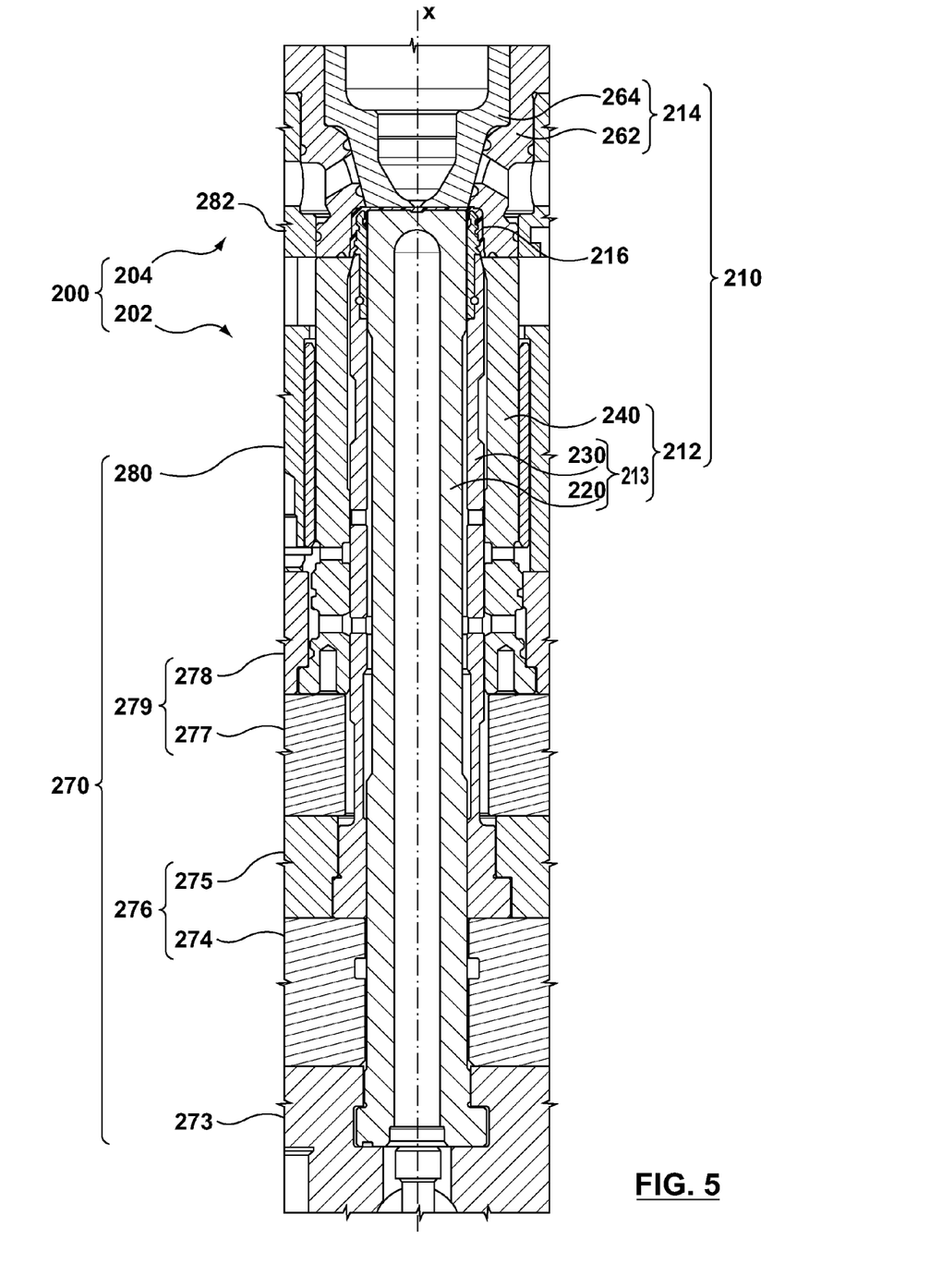
FIGS. 5-9 depict an operational sequence of a second non-limiting embodiment of an injection mold.

With reference to FIG. 5, the detailed construction of another non-limiting embodiment of an injection mold 200 may be appreciated. The construction of the injection mold 200 is similar to the injection mold 100 with the notable exceptions that a mold stack 210 thereof does not include a pair of slides and most particularly that the injection mold 200 is configured to allow for the opening of the mold stack 210 without a requirement, in a traditional sense, for the opening and closing of a first mold half 202 relative to a second mold half 204 in line with the teachings of PCT patent application publication WO 2011/063499 to Halter et al., published on Jun. 3, 2011.

The first stack portion 212 broadly includes a core insert 213 (i.e. an inner core 220 and an outer core 230), and a stripper sleeve 240. Together, the inner core 220 and the outer core 230 are configured to define an inner portion of the molding cavity 216. The stripper sleeve 240 is configured to define a bottom portion of the molding cavity 216 and to strip the molded article 218 (FIG. 6) from the core insert 213.

The first mold shoe 270 is configured to house and reposition the members of the first stack portion 212. The first mold shoe 270 includes an inner core plate assembly 273, an outer core plate assembly 276, a stripper plate assembly 279 and an ejector box 280. The inner core plate assembly 273, the outer core plate assembly 276 and the stripper plate assembly are movable relative to each other, along the mold-stroke axis X, for moving the inner core 220, the outer core 230, and the stripper sleeve 250 that are associated therewith, respectively. The outer core plate assembly 276 includes an outer core plate 274 and an outer core retainer plate 275 that are connectable together for retaining a portion of the outer core 230 therebetween. Similarly, the stripper plate assembly 279 includes a stripper plate 277 and a stripper plate retainer 278 that are connectable together for retaining a portion of the stripper sleeve 240 therebetween.

The structure of the first stack portion 212 will now be described in more detail.

The inner core 220 has a tubular body that is closed at a free end thereof (i.e. the end thereof that is opposite from the inner core plate assembly 273). The free end of the inner core 220 defines part of the inner portion of the molding cavity 216.

The outer core 230 has a tubular body that is slidably arranged around the inner core 220. A free end of the outer core 230 (i.e. the end thereof that is opposite from the outer core plate assembly 276) defines a remaining part of the inner portion of the molding cavity 216. In operation, the outer core 230 is movable relative to the inner core 220, along the mold-stroke axis X, with relative movement of the outer core plate assembly 276 and the inner core plate assembly 273 which may be appreciated by contrasting FIGS. 5 and 6.

The stripper sleeve 240 has a tubular body that is slidably arranged around the outer core 230. A free end of the stripper sleeve 240 (i.e. the end thereof that is opposite from the stripper plate assembly 279) defines a stripping surface 246 (FIG. 8) that is configured for stripping the molded article 218 (FIG. 8) from the outer core 230.

The second mold half 204 broadly includes the second stack portion 214 that is associated with a second mold shoe 282.

The second stack portion 214 broadly includes a cavity insert 262 and a gate insert 264. Together, the cavity insert 262 and the gate insert 264 are configured to define an outer portion of the molding cavity 216. The gate insert 264 is also configured to connect the molding cavity to a source of molding material (not shown) such as a hot runner or the like.

The second mold shoe 282 is configured to house the members of the second stack portion 214.

The description shall now turn to the structure and operation of a pneumatic structure with which to assist in ejecting the molded article 218 from the core insert 213.

Figure 6:
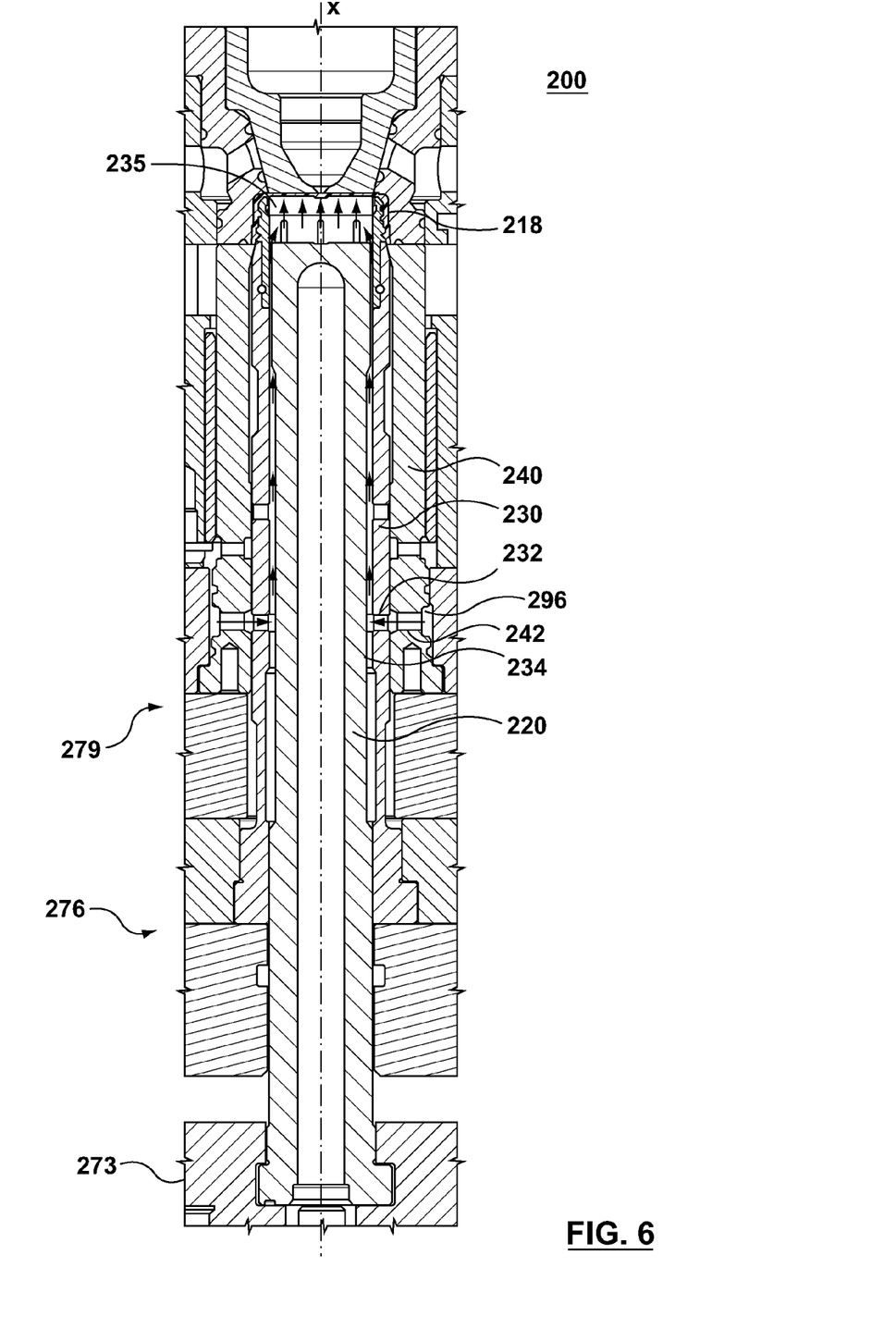

With reference to FIG. 6, a first step of ejection of the molded article 218 from the injection mold 200 has been affected with repositioning of the outer core 230 relative to the inner core 220 which releases an annular portion of the molded article 218 from therebetween. To assist in ejecting the molded article 218 from the inner core 220 compressed air is being routed there behind. The direction of air flow is indicated by flow arrows. In particular, air is being provided from an air source 296 that is defined in the stripper plate retainer 278. The air is directed from the air source 296 through an outer air portal 242 that is defined in the stripper sleeve 240 and from there through an inner air portal 232 that is defined in outer core 230 that is overlapping therewith. Upon exiting the inner air portal 232, the air is directed along an air channel 234 that is defined between the outer core 230 and the inner core 220 and through an outlet 235 thereof that is located behind the molded article 218.

Figure 7:
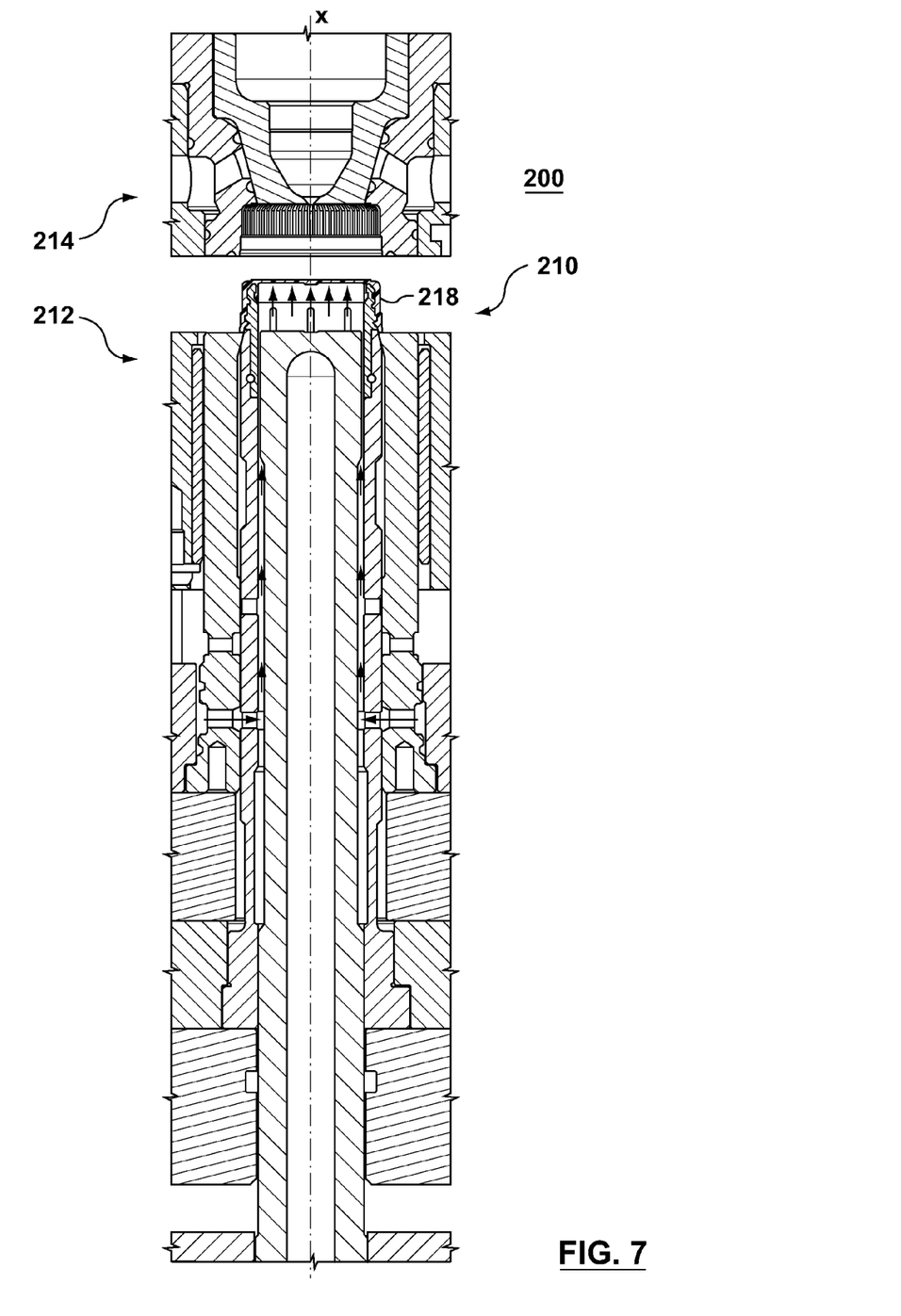

With reference to FIG. 7, the next step in the ejection of the molded article 218 involves opening of the mold stack 210. The opening of the mold stack 210 is provided with relative movement between the first stack portion 212 and the second stack portion 214.

Figure 8:
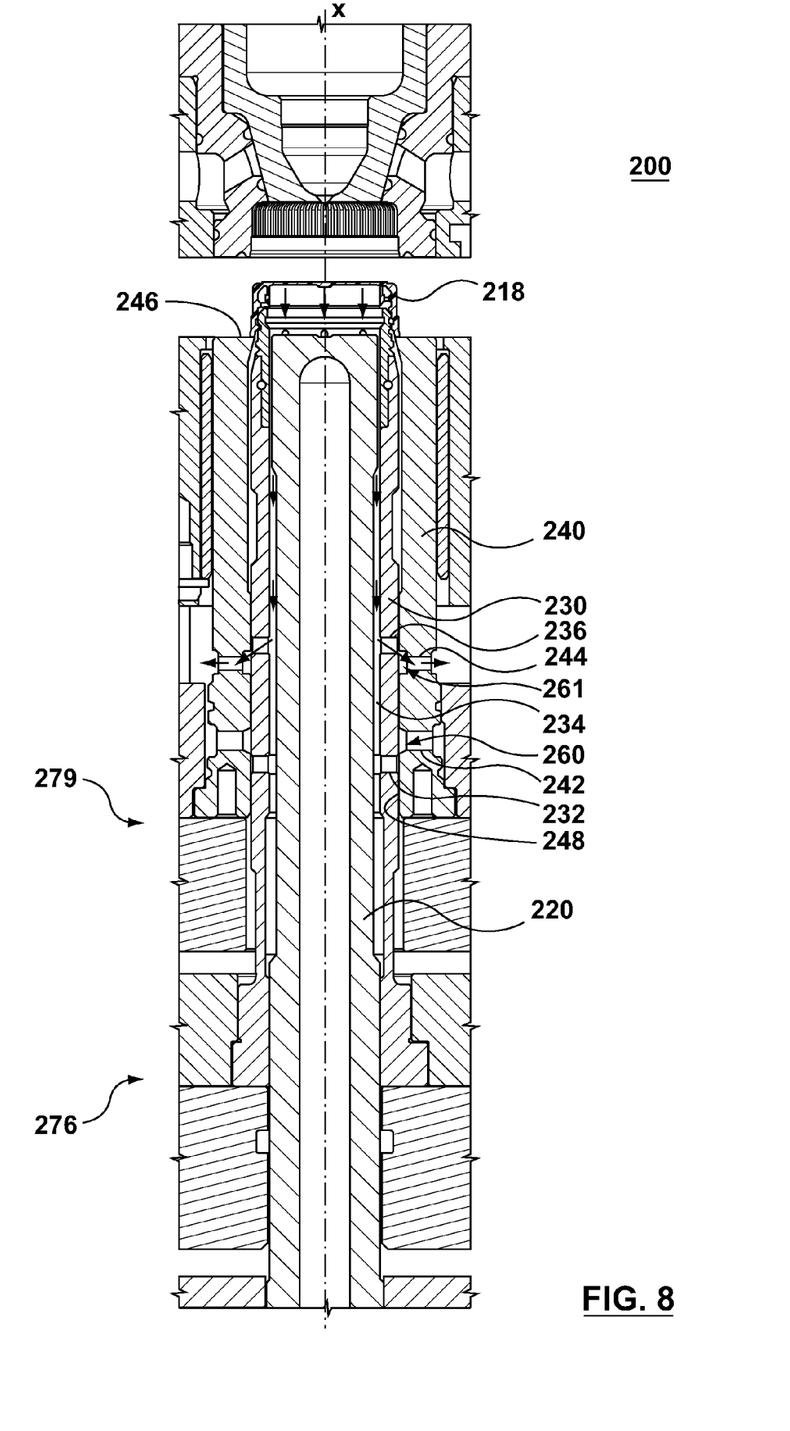

With reference to FIG. 8, the next step in the ejection of the molded article 218 involves the repositioning of the stripper sleeve 240 relative to the outer core 230. In so doing, the stripping surface 246 on the stripper sleeve 240 begins to strip the molded article 218 from the outer core 230. Also with the repositioning of the stripper sleeve 240 relative to the outer core 230 it may be appreciated that the outer air portal 242 is no longer overlapping with the inner air portal 232 and in so doing the inner air portal 132 is isolated, or sealed from the air source. In effect, the outer air portal 242, the inner air portal 232 and an inner surface 248 of the stripper sleeve 240 cooperate to provide an air valve 260 that is actuatable with relative positioning of the stripper sleeve 240 and the outer core 230. More specifically, the air valve 260 may be considered to be open when the stripper sleeve 240 and the outer core 230 have a relative position such as that shown in FIGS. 5, 6, and 7, wherein the outer air portal 242 overlaps with the inner air portal 232 and the air valve 260. In contrast, the air valve 260 may be considered to be closed when the stripper sleeve 240 and the outer core 230 have a relative position such as that shown in FIGS. 8 and 9, wherein the inner air portal 232 is obstructed by the inner surface 248 of the stripper sleeve 240.

Furthermore, the remaining overpressure behind the molded article 218 may be vented to further ensure that there is little to no net force from the air acting on the molded article 218 at the time that it loses contact with the outer core 230. A technical effect of the foregoing may include a predictable and repeatable ejection profile for the molded article 218. To assist in relieving the air pressure from behind the molded article 218 it may be appreciated that the air is routed back down the air channel 234 whereupon it exits an inner vent portal 236 that is defined in the outer core 230 and then into an outer vent portal 244 that is defined in the stripper sleeve 240 that is overlapping therewith and from there into the ambient environment. The direction of air flow is indicated by flow arrows. In effect, the outer vent portal 244, the inner vent portal 236 and the inner surface 248 of the stripper sleeve 240 cooperate to provide an exhaust valve 261 that is actuatable with relative positioning of the stripper sleeve 240 and the outer core 230. More specifically, the exhaust valve 261 may be considered to be closed when the stripper sleeve 240 and the outer core 230 have a relative position such as that shown in FIGS. 5, 6, and 7, wherein the inner vent portal 236 is obstructed by the inner surface 248 of the stripper sleeve 240. In contrast, the exhaust valve 261 may be considered to be open when the stripper sleeve 240 and the outer core 230 have a relative position such as that shown in FIGS. 8 and 9, wherein the outer vent portal 244 overlaps with the inner vent portal 236.

Figure 9:
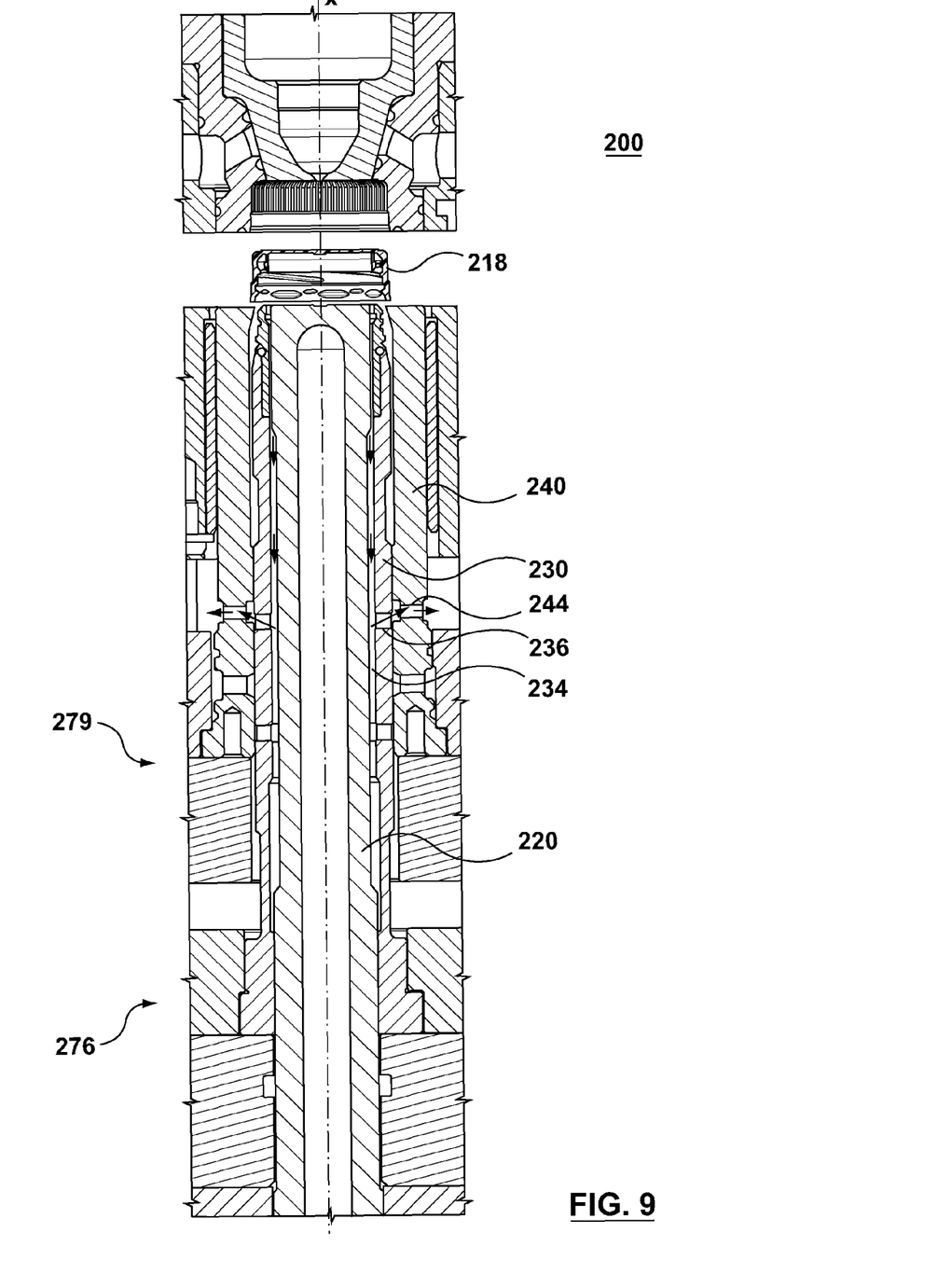

With reference to FIG. 9, the last step in the ejection of the molded article 218 involves simply the further repositioning of the stripper sleeve 240 relative to the outer core 230. In so doing, the stripping surface 246 on the stripper sleeve 240 further strips the molded article 218 from the outer core 230.

Figure 10:
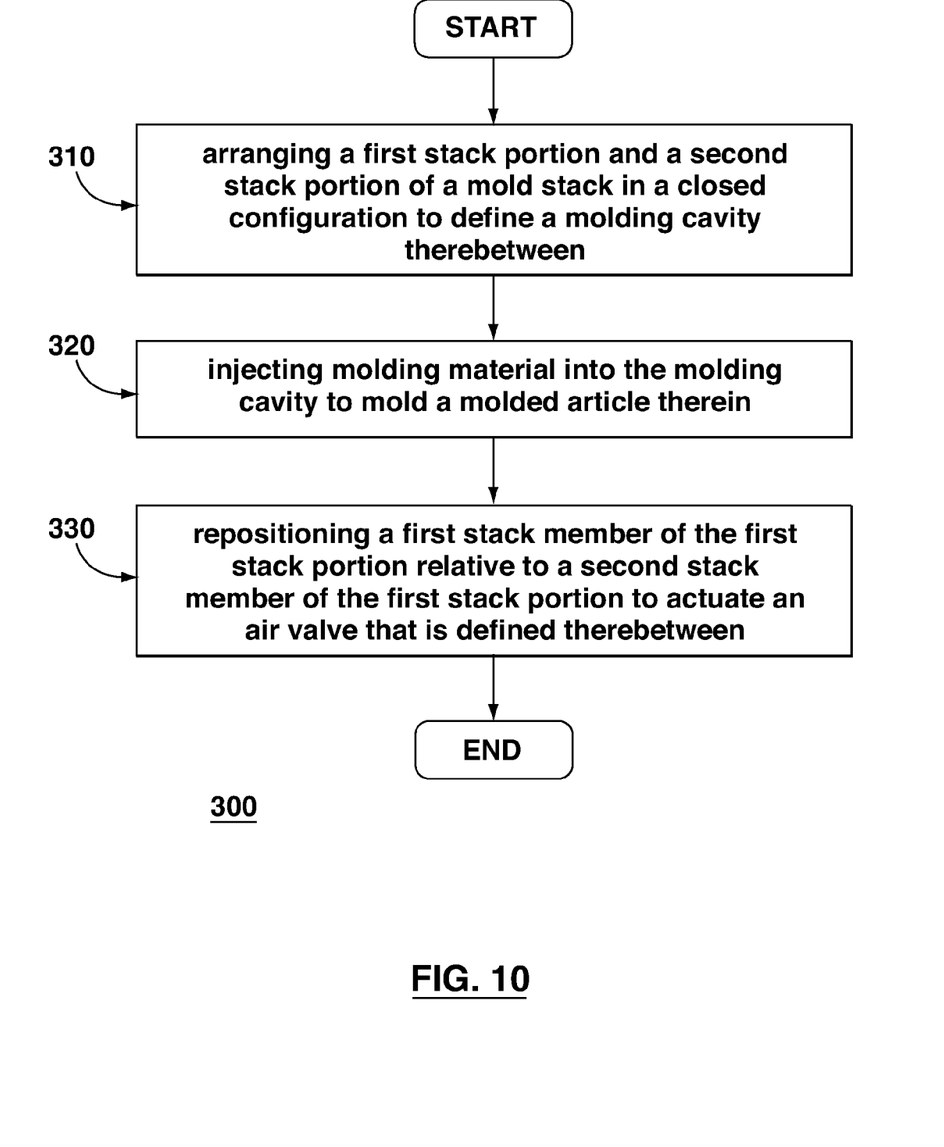
FIG. 10 depicts a flow chart of a method of molding.

Having described several non-limiting embodiments of the structure and operation of the present invention, the description shall now turn to the description of a more general method of molding 300 as depicted with reference to the flow chart of FIG. 10. The method broadly includes the following steps:

Step 310

The method begins, as shown with reference to FIGS. 1 and 5, with arranging the first stack portion 112, 212 and the second stack portion 114, 214 of the mold stack 110, 210 in a closed configuration to define a molding cavity 116, 216 therebetween.

Step 320

The next step, not shown, involves injecting molding material into the molding cavity 116, 216 to mold a molded article 118, 218 (FIGS. 2 and 6) therein.

Step 330

The method then ends, or repeats, as shown with reference to FIGS. 3 and 6, with a repositioning of a first stack member, such as, for example, the core insert 113, 213 of the first stack portion 112, 212, relative to a second stack member, such as, for example, the stripper sleeve 140, 240 of the first stack portion 112, 212, to actuate the air valve 160, 260 that is defined therebetween. The actuation of the air valve 160, 260 allows air to flow, for example, to assist in ejecting the molded article 118, 218 from the inner core 120, 220 of the first stack portion 112, 212.

More particularly, in the non-limiting embodiments described above, the repositioning of the first stack member of the first stack portion 112, 212 relative to the second stack member of the first stack portion 112, 212 opens the air valve 160, 260 to connect the air source 196, 296 with the air channel 134, 234 that is defined in the first stack portion 112, 212. The first stack member and the second stack member may comprise the core insert 113, 213 and the stripper sleeve 140, 240, respectively, wherein repositioning of the stripper sleeve 140, 240 relative to the core insert 113, 213 strips the molded article 118, 218 from the core insert 113, 213, at least in part. In so doing, air from the air channel 134, 234 is routed behind the molded article 118, 218 to assist in the ejecting thereof from the core insert 113, 213.

Figure 4B:
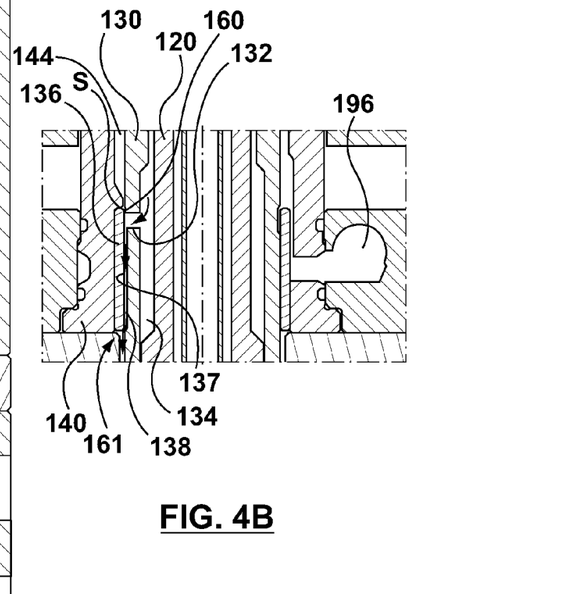
FIG. 4B depicts an enlarged view of a portion of FIG. 4A—as indicated therein.

The method of molding 300 may further comprise the step, as shown with reference to FIGS. 4A, 4B and 8, of further repositioning of the first stack member of the first stack portion 112, 212 relative to the second stack member of the first stack portion 112, 212 to further strip the molded article 118, 218 from the core insert 113, 213, close the air valve 160, 260 and open an exhaust valve 161, 261 to connect the air channel 134, 234 with the ambient environment, whereby overpressure behind the molded article 118, 218 may be vented to ensure that there is little to no net force from the air acting on the molded article 118, 218 at the time that it loses contact with the core 113, 213. A technical effect of the foregoing may include a predictable and repeatable ejection profile for the molded article 118, 218.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying the invention in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A first stack portion (112, 212) of a mold stack (110, 210) for use in a mold (100, 200), comprising:
   a first stack member that is configured to define a molding cavity (116, 216) in cooperation with a second stack portion (114, 214) of the mold stack (110, 210);
   a second stack member that is movable relative to the first stack member;
   an air valve (160, 260) is defined between the first stack member and the second stack member, the air valve (160, 260) being selectively actuatable with relative movement of the first stack member and the second stack member;
   the air valve (160, 260) is configured to control air flow between an air source (196, 296) and an air channel (134, 234);
   an exhaust valve (161, 261) is defined between the first stack member and the second stack member, the exhaust valve (161, 261) being selectively actuatable with the relative movement of the first stack member and the second stack member; and
   the exhaust valve (161, 261) is configured to control the air flow between the air channel (134, 234) and a vent channel (138, 238).

2. The first stack portion (112, 212) of claim 1, wherein:
   the first stack member and the second stack member comprise a core insert (113, 213) and a stripper sleeve (140,

240), respectively, wherein the stripper sleeve (140, 240) is slidably arranged around the core insert (113, 213), the core insert (113, 213) being configured to define an inner portion the molding cavity (116, 216), the stripper sleeve (140, 240) being configured to strip a molded article (118) from the core insert (113, 213) with the relative movement thereof.

3. The first stack portion (112, 212) of claim 2, wherein:
the core insert (113, 213) comprises an inner core (120, 220) and an outer core (130, 230), the outer core (130, 230) being slidably arranged around the inner core (120, 220), and wherein the air channel (134, 234) is defined between the outer core (130, 230) and the inner core (120, 220).

4. The first stack portion (112) of claim 3, wherein:
an air chamber (144) is defined between the stripper sleeve (140) and the outer core (130), the air chamber (144) being connectable to the air source (196) via an outer air portal (142) that is defined in the stripper sleeve (140);
an inner air portal (132) is defined in the outer core (130) through which air from the air chamber (144) may be directed into the air channel (134);
wherein the air valve (160) is provided by the inner air portal (132) in cooperation with a seal member (136) that is associated with the stripper sleeve (140), the stripper sleeve (140) and the outer core (130) being positionable to open the air valve (160) when the inner air portal (132) is unobstructed by the seal member (136), and wherein the stripper sleeve (140) and the outer core (130) are positionable to close the air valve (160) when the inner air portal (132) is obstructed by the seal member (136).

5. The first stack portion (112) of claim 4, wherein:
the vent channel (138) is defined between the seal member (136) and a vent groove (137) that is defined on an outer surface of the outer core (130);
the exhaust valve (161) is provided by the vent channel (138) in cooperation with the seal member (136), the stripper sleeve (140) and the outer core (130) being positionable to open the exhaust valve (161) when the vent groove (137) is unobstructed by the seal member (136), and wherein the stripper sleeve (140) and the outer core (130) are positionable to close the exhaust valve (161) when the vent groove (137) is obstructed by the seal member (136).

6. The first stack portion (212) of claim 3, wherein:
an outer air portal (242) is defined in the stripper sleeve (240) through which air from the air source (296) may be directed;
an inner air portal (232) is defined in the outer core (230) through which the air from the outer air portal (242) may be directed into the air channel (234);
wherein the air valve (260) is provided by the inner air portal (232) in cooperation with an inner surface (248) of the stripper sleeve (240), the stripper sleeve (240) and the outer core (230) being positionable to open the air valve (260) when the inner air portal (232) overlaps with the outer air portal (242), and wherein the stripper sleeve (240) and the outer core (230) are positionable to close the air valve (260) when the inner air portal (232) is obstructed by the inner surface (248) of the stripper sleeve (240).

7. The first stack portion (212) of claim 5, wherein:
an inner vent portal (236) is defined in the outer core (230) through which the air from the air channel (234) may be directed;
an outer vent portal (244) is defined in the stripper sleeve (240) through which the air from the inner vent portal (236) may be directed into an ambient environment;
wherein the exhaust valve (261) is provided by the inner vent portal (236) in cooperation with an inner surface (248) of the stripper sleeve (240), the stripper sleeve (240) and the outer core (230) being positionable to open the exhaust valve (261) when the inner vent portal (236) overlaps with the outer vent portal (244), and wherein the stripper sleeve (240) and the outer core (230) are positionable to close the exhaust valve (261) when the inner vent portal (236) is obstructed by the inner surface (248) of the stripper sleeve (240).

8. A method of molding (300), comprising:
arranging (310) a first stack portion (112, 212) and a second stack portion (114, 214) of a mold stack (110, 210) in a closed configuration to define a molding cavity (116, 216) therebetween;
injecting (320) molding material into the molding cavity (116, 216) to mold a molded article (118, 218) therein;
repositioning (330) a first stack member of the first stack portion (112, 212) relative to a second stack member of the first stack portion (112, 212) to actuate an air valve (160, 260) that is defined therebetween;
the repositioning of the first stack member of the first stack portion (112, 212) relative to the second stack member of the first stack portion (112, 212) opens the air valve (160, 260) to connect an air source (196, 296) with an air channel (134, 234) that is defined in the first stack portion (112, 212);
the first stack member and the second stack member comprise a core insert (113, 213) and a stripper sleeve (140, 240), respectively, wherein repositioning of the stripper sleeve (140, 240) relative to the core insert (113, 213) strips the molded article (118, 218) from the core insert (113, 213), at least in part;
wherein air from the air channel (134, 234) is routed behind the molded article (118, 218) to assist in ejecting the molded article (118, 218) from the core insert (113, 213);
further repositioning of the first stack member of the first stack portion (112, 212) relative to the second stack member of the first stack portion (112, 212) to further strip the molded article (118, 218) from the core insert (113, 213), close the air valve (160, 260) and open an exhaust valve (161, 261) to connect the air channel (134, 234) with an ambient environment, whereby overpressure behind the molded article (118, 218) may be vented.

\* \* \* \* \*